US008929891B2

United States Patent
Wu et al.

(10) Patent No.: US 8,929,891 B2
(45) Date of Patent: Jan. 6, 2015

(54) MEASUREMENT CONTROL FOR HANDOVER FROM ONE RADIO ACCESS TECHNOLOGY TO ANOTHER

(75) Inventors: Wei Wu, Coppell, TX (US); Zhijun Cai, Euless, TX (US); James Earl Womack, Bedford, TX (US); Xiaoming Zhao, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1241 days.

(21) Appl. No.: 11/866,282

(22) Filed: Oct. 2, 2007

(65) Prior Publication Data
US 2009/0088159 A1 Apr. 2, 2009

(51) Int. Cl.
*H04W 4/00* (2009.01)
*H04W 36/00* (2009.01)
*H04W 36/14* (2009.01)
*H04W 48/18* (2009.01)

(52) U.S. Cl.
CPC .............. *H04W 36/14* (2013.01); *H04W 48/18* (2013.01)
USPC ...................... 455/435.1; 455/432.1; 455/436; 455/437

(58) Field of Classification Search
CPC ..... H04W 36/14; H04W 36/24; H04W 36/26; H04W 36/30; H04W 48/18
USPC ........................ 455/552.1, 553.1, 432.1–453
See application file for complete search history.

(56) References Cited

U.S. PATENT DOCUMENTS

| | | | |
|---|---|---|---|
| 6,748,246 B1 * | 6/2004 | Khullar | 455/574 |
| 6,996,398 B1 * | 2/2006 | Powell | 455/433 |
| 2003/0017842 A1 * | 1/2003 | Moles et al. | 455/552 |
| 2003/0134637 A1 * | 7/2003 | Cooper | 455/432 |
| 2004/0082328 A1 * | 4/2004 | Japenga et al. | 455/436 |
| 2004/0116110 A1 | 6/2004 | Amerga et al. | |
| 2005/0003816 A1 * | 1/2005 | Vardoulias et al. | 455/435.2 |
| 2005/0025181 A1 | 2/2005 | Nazari | |
| 2005/0130611 A1 * | 6/2005 | Lu et al. | 455/130 |
| 2005/0202828 A1 * | 9/2005 | Pecen et al. | 455/453 |
| 2005/0239443 A1 * | 10/2005 | Watanabe et al. | 455/414.1 |
| 2006/0003763 A1 * | 1/2006 | Almgren | 455/432.1 |
| 2006/0035670 A1 * | 2/2006 | Souissi et al. | 455/557 |
| 2006/0094427 A1 | 5/2006 | Buckley et al. | |
| 2008/0182615 A1 * | 7/2008 | Xue et al. | 455/552.1 |
| 2009/0082017 A1 * | 3/2009 | Chang et al. | 455/435.2 |

FOREIGN PATENT DOCUMENTS

WO 2005122601 A2 12/2005

OTHER PUBLICATIONS

3GPP TS 25.331 v7.0.0; 3rd Generation Partnership Project; Technical Specification Group Radio Access Network; Radio Resource Control (RRC); Protocol Specification; Release 7; Mar. 2006; 1249 pgs.

(Continued)

*Primary Examiner* — Wesley Kim
(74) *Attorney, Agent, or Firm* — Conley Rose, P.C.; J. Robert Brown, Jr.

(57) ABSTRACT

A method is provided for measuring at least one radio condition of each of a plurality of radio access technologies (RATs). The method includes specifying a sequence of the RATs, and measuring at least one radio condition of a first RAT in the sequence before measuring at least one radio condition of a second RAT in the sequence.

21 Claims, 6 Drawing Sheets

(56) References Cited

OTHER PUBLICATIONS

3GPP TSG RAN WG2#59; Title: Generic Interface between MME and Non-3GPP Access; R2-073053; Athens, Greece; Aug. 20-24, 2007; 2 pgs.

3GPP TS 36.300 v8.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Jun. 2007; 106 pgs.

3GPP TR 36.938 v1.0.0; 3rd Generation Partnership Project; Technical Specification Group Radio Access Network; Improved Network Controlled Mobility between E-UTRAN and 3GPP2/Mobile WiMAX Radio Technologies; Oct. 2007; 35 pgs.

European Examination Report; EP Patent Application No. 07120459.8; Feb. 23, 2010; 5 pgs.

EP Search and Examination Report; EP Application No. 07120459; Jan. 23, 2008; 7 pgs.

Third European Examination Report; EP Application No. 07120459.8; Apr. 29, 2009; 6 pgs.

Second EP Search and Examination Report; EP Application No. 07120459.8; Nov. 25, 2008; 5 pgs.

European Extended Search Report; EP Application No. 10193872.8; Mar. 28, 2011; 7 pages.

European Examination Report; Application No. 10193872.8; Nov. 9, 2012; 6 pages.

European Examination Report; Application No. 10193872.8; Sep. 20, 2013; 7 pages.

EP Examination Report; Application No. 10193872.8; Nov. 5, 2014; 7 pages.

* cited by examiner

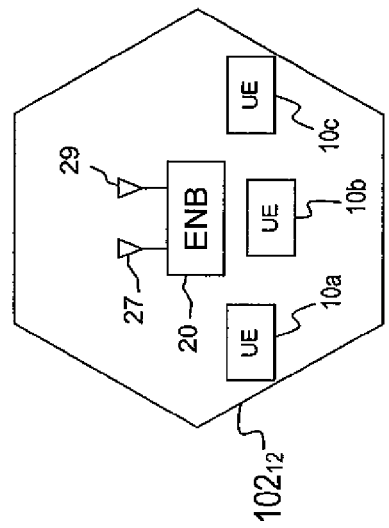
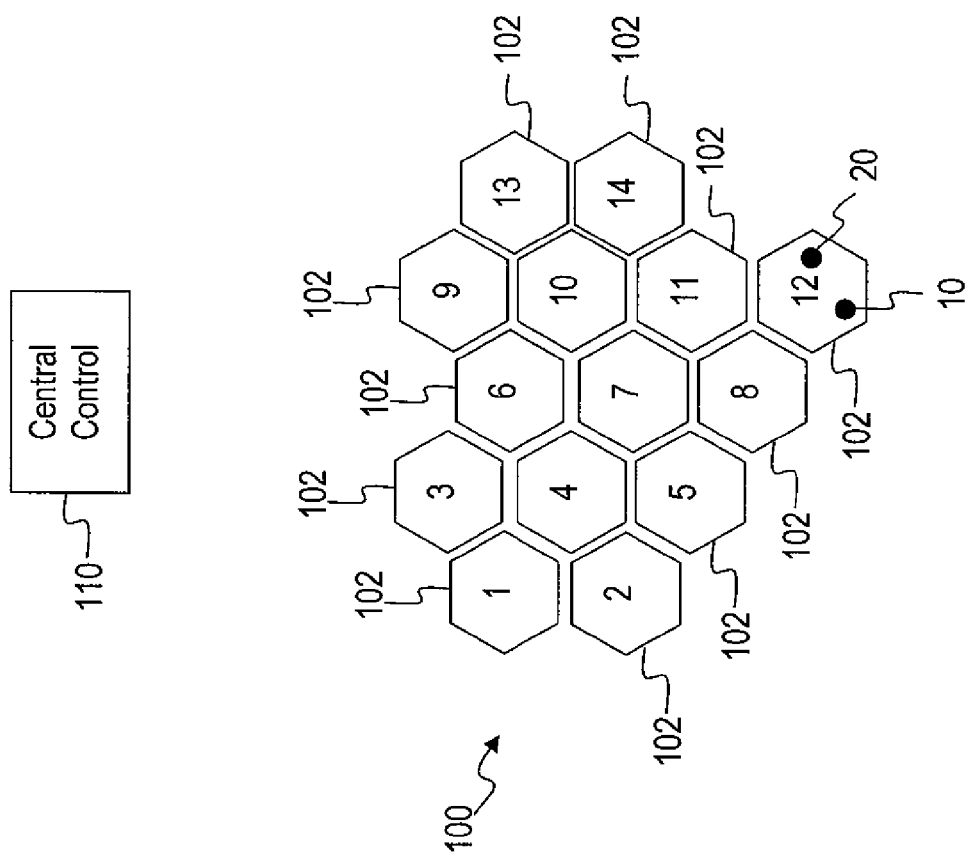
Figure 2
Figure 1

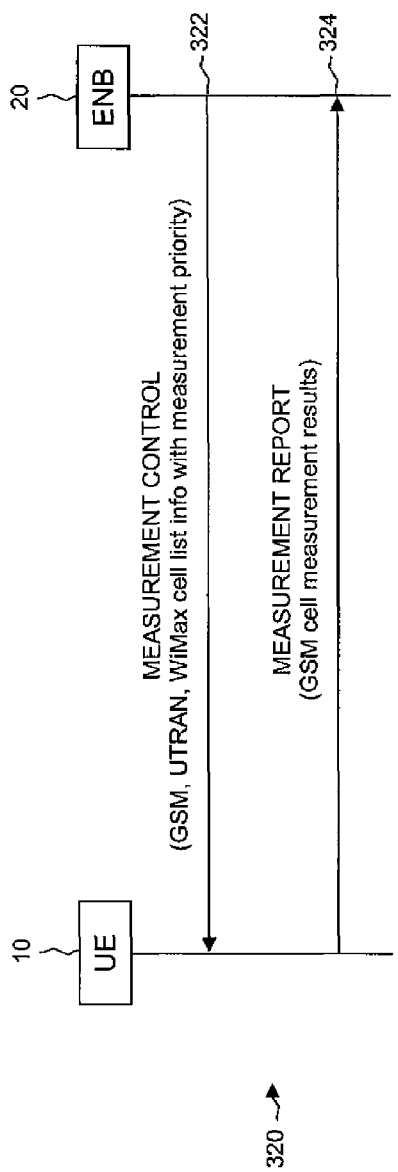
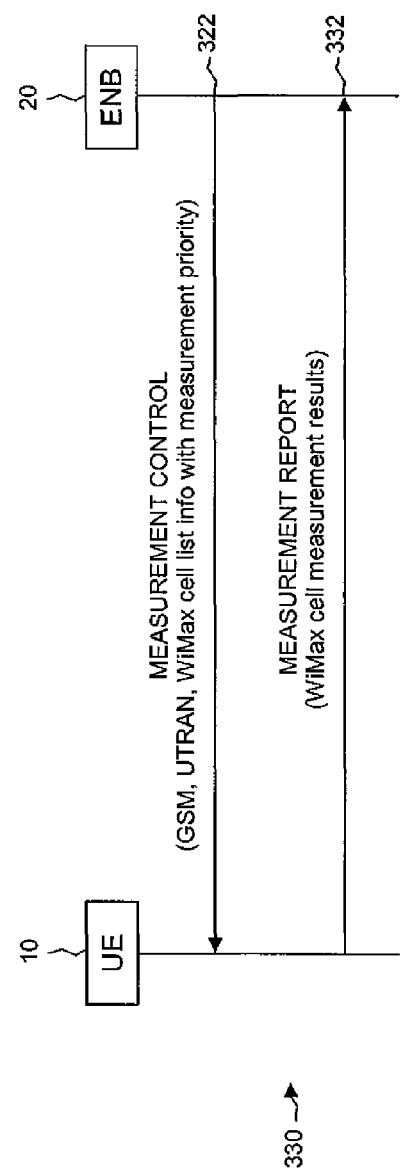

MEASUREMENT CONTROL FOR HANDOVER FROM ONE RADIO ACCESS TECHNOLOGY TO ANOTHER

BACKGROUND

Easily transportable devices with wireless telecommunications capabilities, such as mobile telephones, personal digital assistants, handheld computers, and similar devices, will be referred to herein as user equipment (UE). A communications connection between two UEs can be referred to as a call or a session.

As telecommunications technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

In traditional wireless telecommunications systems, transmission equipment in a base station transmits signals throughout a geographic region known as a cell. For LTE and other advanced equipment, the region in which a UE can gain access to a telecommunications network might be referred to by a different name, such as a hot spot. The term "cell" will be used herein to refer to any region in which a UE can gain access to a telecommunications network, regardless of the type of UE and regardless of whether the region is a traditional cell, a region served by LTE equipment such as an ENB, or some other region or location in which wireless telecommunications services are available.

Some UEs communicate in a circuit switched mode, wherein a dedicated communication path exists between two devices. For the duration of a call or session, all data exchanged between the two devices travels along the single path. Some UEs have the capability to communicate in a packet switched mode. In packet switching, a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Communications that take place via circuit switching can be said to occur in the circuit switched domain and communications that take place via packet switching can be said to occur in the packet switched domain.

Different UEs might use different types of radio access technology (RAT) to access a telecommunications network. Some UEs, which can be referred to as multi-domain UEs or multi-mode UEs, are capable of communicating using more than one RAT. Examples of RATs or of network technologies that might use different types of RATs include Code Division Multiple Access 2000 (CDMA2000), UTRAN (UTMS (Universal Mobile Telecommunications System) Terrestrial Radio Access Network), Global System for Mobile Communications (GSM), GSM EDGE Radio Access Network (GERAN), Generic Access Network (GAN), Wireless Local Area Network (WLAN), General Packet Radio Service (GPRS), Worldwide Interoperability for Microwave Access (WiMAX), 1× Evolution-Data Optimized (1× EV-DO), High-Speed Downlink Packet Access (HSDPA), Digital Enhanced Cordless Technology (DECT), and High Rate Packet Data (HRPD). Other RATs or other network technologies based on these RATs may be familiar to one of skill in the art.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is an illustration of a cellular network according to an embodiment of the disclosure.

FIG. 2 is an illustration of a cell in a cellular network according to an embodiment of the disclosure.

FIG. 4a is a call flow diagram according to an embodiment of the disclosure.

FIG. 4b is a call flow diagram according to an alternative embodiment of the disclosure.

DETAILED DESCRIPTION

Figure 3:
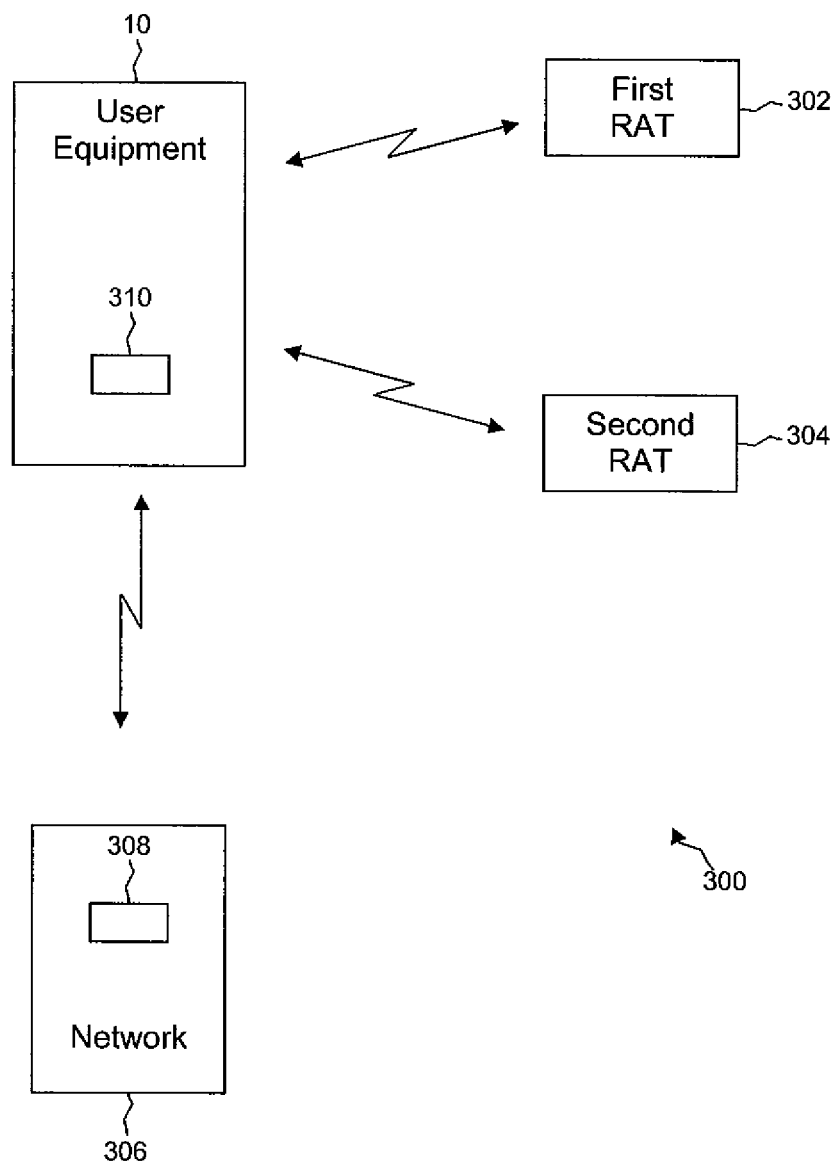
FIG. 3 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is provided for measuring at least one radio condition of a plurality of radio access technologies (RATs). The method includes specifying a sequence of the RATs, and measuring at least one radio condition of a first RAT in the sequence before measuring at least one radio condition of a second RAT in the sequence.

In another embodiment, a system for testing radio access technology (RAT) radio conditions is provided. The system includes user equipment configured to measure radio conditions of each of a plurality of RATs, and a priority list of specifying an order in which to measure the RATs.

In another embodiment, a multi-mode user equipment is provided. The multi-mode user equipment includes a processor configured to measure a radio condition of a first radio access technology (RAT) in a first sequence of RATs specified in a priority list before measuring at least one radio condition of a second RAT in the first sequence.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represent a coverage area for providing cellular services of the cellular network 100 through communication from an enhanced node B (ENB). While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 might be present in each of the cells 102. An ENB 20 in each of the cells 102 performs functions similar to those of a traditional base station. That is, the ENBs 20 provide a radio link between the UEs 10 and other components in a telecommunications network. While the ENB 20 is shown only in cell $102_{12}$, it should be understood that an ENB would be present in each of the cells 102. Also, radio links other than the ENBs 20 could be used. A central control 110 oversees the wireless data transmissions within the cells 102 by providing centralized management and coordination for the cells 102 and their corresponding ENBs 20.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $102_{12}$. The ENB 20 in cell $102_{12}$ can promote communication via a transmitter 27, a receiver 29, and/or other well known equipment. Similar equipment might be present in the other cells 102. A plurality of UEs 10 are present in the cell $102_{12}$, as might be the case in the other cells 102.

As a user of one of the UEs 10 moves, the quality of the radio conditions for an existing call or session might deteriorate, and control of the session might need to be handed off or handed over to a different cell 102. Radio condition parameters might include one or more of signal strength, path loss, propagation delay, received reference symbol power, and other signal quality parameters known to one of skill in the art. Several nearby cells 102 might be available to receive the handoff, and several different types of RAT might be available in each of the cells 102. In such cases, the UE 10 might make measurements of the signal strengths and other radio conditions of the available RATs.

In an embodiment, the measurements of the radio conditions of the available RATs are performed in a pre-specified order. In some cases, the order in which the measurements are made is specified by the telecommunications operator and/or provider in a prioritized list of RATs. In other cases, the UE 10 specifies the order of the measurements as a list of preferred RATs.

In the cases where the telecommunications operator specifies the priority of the measurements, a list might be created having a plurality of RATs arranged in order of priority. A component of a telecommunications network might then transmit the priority list to the UE 10, and the UE 10 might make the measurements in the specified order. That is, when the radio conditions of an existing call begin to deteriorate, a measurement of the radio conditions of the RAT with the highest priority might be made first. If the radio conditions of this first RAT are found to exceed some predefined threshold, the measurement procedure can stop. At that point, the session, which could be an active call, or idle or other communication, might be handed off to the new RAT. The threshold may be any specified radio condition parameter(s) or quality measurements. If the radio conditions of the first RAT are found to be below the threshold, a measurement of the radio conditions of the RAT with the second highest priority might be made. If the radio conditions of the second RAT exceed the threshold, the measurement procedure can stop. This procedure of measuring the radio conditions of the RATs in the sequence specified in the priority list might continue until a RAT is found that exceeds the quality threshold.

In an alternative to the cases where the telecommunications operator specifies the sequence of the measurements, measurements might be made of the radio conditions for all RATs in a list of RATs specified by the telecommunications operator. The RAT with the most favorable radio conditions might then be selected to receive the handoff. While this alternative might promote a high quality radio signal between the UE 10 and the cell 102 that is using the selected RAT, this alternative might also be wasteful of resources since excessive battery power might be consumed in performing unnecessary measurements of the radio conditions of RATs with low quality signals. The previously mentioned alternative might be preferred in some embodiments, where the radio conditions of the priority list of RATs are measured in sequence until a RAT with adequate or a threshold radio conditions is found, which may save battery power by eliminating unnecessary measurements of radio conditions.

In the cases where the UE 10 specifies the order of the measurements as a list of preferred RATs, a list might be created having a plurality of RATs arranged in order of preference. This preference list might be modifiable by a user of the UE 10 or others and might be in lieu of or might override the priority list when there is a difference between the two lists. When the radio conditions of an existing call begin to deteriorate, a measurement of the radio conditions of the RAT with the highest preference might be made first. If the radio conditions of this first RAT are found to exceed some predefined threshold, the measurement procedure can stop. If the radio conditions of the first RAT are found to be below the threshold, a measurement of the radio conditions of the RAT with the second highest preference might be made. If the radio conditions of the second RAT exceed the threshold, the measurement procedure can stop. This procedure of measuring the radio conditions of the RATs in the sequence specified in the list of preferred RATs might continue until a RAT is found that exceeds the quality threshold.

The use of the priority list and/or the preference list can apply to a handoff from any type of RAT to any other type of RAT. For example, the handoff might be made from one circuit switched RAT to another circuit switched RAT, such as from CDMA to UTRAN or vice versa. Alternatively, the handoff might be made from one packet switched RAT to another packet switched RAT, such as from WiMAX to GPRS or vice versa. Alternatively, the handoff might be made from a circuit switched RAT to a packet switched RAT or vice versa.

The order of the RATs in the priority list or the preference list can be based on any of several factors. For example, for the priority list, the telecommunications operator might specify that the RATs should be prioritized based on a call remaining in the same domain whenever possible. That is, when an existing call is in a circuit switched network, the priority list might specify that circuit switched RATs should have a higher priority than packet switched RATs. Similarly, when an existing call is in a packet switched network, the priority list might specify that packet switched RATs should have a higher priority than circuit switched RATs. For the preference list, the UE user might specify, for example, that the radio conditions of RATs that have a lower cost for use should be measured before the radio conditions of RATs that are more expensive to use. In this way, the user can be assured of using the lowest cost technology that is available.

In an alternative embodiment, the telecommunications operator might specify in the priority list that the radio conditions of RATs that use Third Generation Partnership Project (3GPP) technologies, such as GSM and UTRAN, should be measured first. If no adequate 3GPP RATs are found, then the radio conditions of one or more RATs that use a non-3GPP technology can be measured. The non-3GPP technologies might be WiMAX, WLAN, Wireless Fidelity (WiFi), or similar technologies. Other ways of determining the sequence of RATs in the priority list or the preference list may be apparent to one of skill in the art.

FIG. 3 is a block diagram of an embodiment of a system 300 that includes a multi-mode UE 10, a cell using a first RAT 302, and a cell using a second RAT 304. The first RAT 302 and the second RAT 304 might be used in the same cell 102 or in different cells 102. In other embodiments, additional cells 102 and/or additional RATS might be present. While the UE 10 is depicted as communicating with the first RAT 302 and the second RAT 304, it should be understood that the UE 10 would actually communicate with one or more ENBs 20 (or other systems depending on the details of the particular RAT) in one or more cells 102 via the first RAT 302 and/or the second RAT 304. Hereinafter, the communication of the UE 10 with one or more ENBs 20 or other systems via a particular RAT may be referred to simply as communication with or in that RAT.

The UE 10 can communicate with a telecommunications network 306. Actions that are described herein as being directed to or taken by the network 306 should be understood as being directed to or performed by one or more components within the network 306. The components might be one of the ENBs 20, the central control 110, a computing device, or some other component or set of components capable of interacting appropriately with the UE 10.

The network 306 might maintain a priority list 308 that lists by priority a sequence in which the first RAT 302 and the second RAT 304 should be tested for the quality of their radio conditions. Alternatively or in addition, the UE 10 might maintain a preference list 310 that lists by preference a sequence in which the first RAT 302, the second RAT 304, and so on should be tested for the quality of their radio conditions.

The UE 10 can be assumed to be currently engaged in a call in a RAT that is not shown, and the quality of the radio conditions for this call can be assumed to be deteriorating or for any other reason another RAT may be desired. In an embodiment, the UE 10 might inform the network 306 of the deterioration of the quality of the radio conditions of the RAT with which it is communicating. The network 306 might then send the UE 10 the priority list 308. Alternatively, the network 306 might send the priority list 308 to the UE 10 prior to the deterioration of the radio conditions and the UE 10 might store the priority list 308 for use when radio condition deterioration occurs. In other embodiments, the UE 10 might use its own list 310 stored on the UE 10. In either case, when the quality of the radio conditions of the RAT with which the UE 10 is currently communicating falls below a threshold, the UE 10 can consult the priority list 308 to determine the sequence in which it is to test the first RAT 302 and the second RAT 304 for the quality of the radio conditions available from those RATs.

As an example, the priority list 308 might specify that the first RAT 302 is to be checked first and the second RAT 304 is to be checked second. In other cases, the order of measurement might be reversed and/or measurements of additional RATs, not shown, might be specified. In this example, it can be assumed that the radio conditions of the first RAT 302 fall below a quality threshold and that the radio conditions of the second RAT 304 are above the quality threshold. In such a case, the UE 10 would first measure the radio conditions of the first RAT 302, as specified in the priority list 308. The UE 10 would find the radio conditions of the first RAT 302 inadequate and would then measure the radio conditions of the second RAT 304, as specified in the priority list 308. The UE 10 would find the radio conditions of the second RAT 304 adequate and would stop taking measurements. The UE 10 might then inform the network 306 that the second RAT 304 has adequate radio conditions. Standard handoff procedures might then take place to hand the existing call off to the cell 102 that is using the second RAT 304.

It may happen that the radio conditions of both the first RAT 302 and the second RAT 304 are inadequate. In such cases, if additional RATs are listed in the priority list 308, the UE 10 continues making measurements of the radio conditions of the additional RATs in the order specified in the priority list 308 until a RAT with adequate radio conditions is found. The measurements can stop at that point, and the UE 10 might then inform the network 306 of the RAT that was found. Standard handoff procedures might then take place to hand the existing call off to the cell 102 that is using that RAT.

In an alternative embodiment, the list 308 might not prioritize the order in which the first RAT 302 and the second RAT 304 are to be tested. Both the first RAT 302 and the second RAT 304 might be tested and the one with the better radio conditions might be selected. As mentioned above, however, such an alternative may not be preferable since it could be wasteful of battery resources. For example, the first RAT 302 might be present but the second RAT 304 might not be present. If the list 308 specifies that the radio conditions of both the first RAT 302 and the second RAT 304 are to be measured, a measurement would be attempted for a RAT that was not available. This problem could be exacerbated if the list 308 contained a large number of RATs. In such cases, only a small number of RATs might actually be available to the UE 10, but measurements of radio conditions would be attempted for all of the RATs on the list 308 despite a majority of them being unavailable for measurement.

In another alternative, the UE 10 includes a preference list 310 that specifies an order in which the first RAT 302 and the second RAT 304 are preferred to be used. The preference list 310 might override the priority specified in the priority list 308. As an example, the preference list 310 might specify that the second RAT 304 should be used if it has adequate radio conditions, and that if the second RAT 304 does not have adequate radio conditions, the first RAT 302 should be used. The radio conditions of the second RAT 304 would then be measured before those of the first RAT 302 even though, continuing the example above, the reverse priority was specified in the priority list 308. If, as in the above example, the radio condition quality of the second RAT 304 was above a threshold, the measurements could stop, and the UE 10 could inform the network 306 that the second RAT 304 has adequate radio conditions. Standard handoff procedures might then take place to hand the existing call off to the cell 102 that is using the second RAT 304. No measurement of the radio conditions of the first RAT 302 would need to take place.

FIG. 4a is a call flow diagram 320 depicting an example of a series of events that might occur in the measurement of the quality of the radio conditions of a plurality of RATs when the priority list 308 is used. The UE 10 is in communication with one or more telecommunications network components as described above. The components might be the one of the ENBs 20, as depicted in FIG. 4a, and/or might be a central control 110 or some other component.

At event 322, the ENB 20 sends the UE 10 a measurement control message containing the priority list 308. In other embodiments, the entire list 308 might not be sent and instead the RATs to be measured might be sent to the UE 10 one at a time. When a priority list 308 is used, it may specify that measurements are to be made of the radio conditions of at least one GSM RAT, at least one UTRAN RAT, and at least one WiMAX RAT, in that order. At event 324, the UE 10 sends the ENB 20 a report of the measurements it has made of those radio conditions. In this case, the UE 10 finds that at least one GSM RAT has adequate radio conditions, makes no further measurements, and sends the ENB 20 a report of the GSM RAT measurement results. In some embodiments, the network 306, central control 110, or other systems may monitor the location of UE 10 and may have knowledge of the RATs in the vicinity. In this case, the priority list 308 might be updated and change over time as the UE 10 moves in and out of areas with different RATs. In this manner, the UE 10 might further conserve power by only measuring the radio conditions of RATs that are known to be in the vicinity.

FIG. 4b is a call flow diagram 330 depicting events similar to those in FIG. 4a, except that, in FIG. 4b, the preference list 310 is used. At event 322, the ENB 20 again sends the UE 10 a measurement control message containing the priority list 308. The priority list 308 again specifies that measurements are to be made of the radio conditions of at least one GSM RAT, at least one UTRAN RAT, and at least one WiMAX RAT, in that order. However, in this case, the preference list 310 may specify, for example, that WiMAX is the preferred RAT, and that, therefore, the radio conditions of at least one WiMAX RAT should be measured first. At event 332, the radio conditions of at least one WiMAX RAT may have been found to be adequate, and the UE 10 sends the ENB 20 a report of the WiMAX RAT measurement results.

Figure 5:
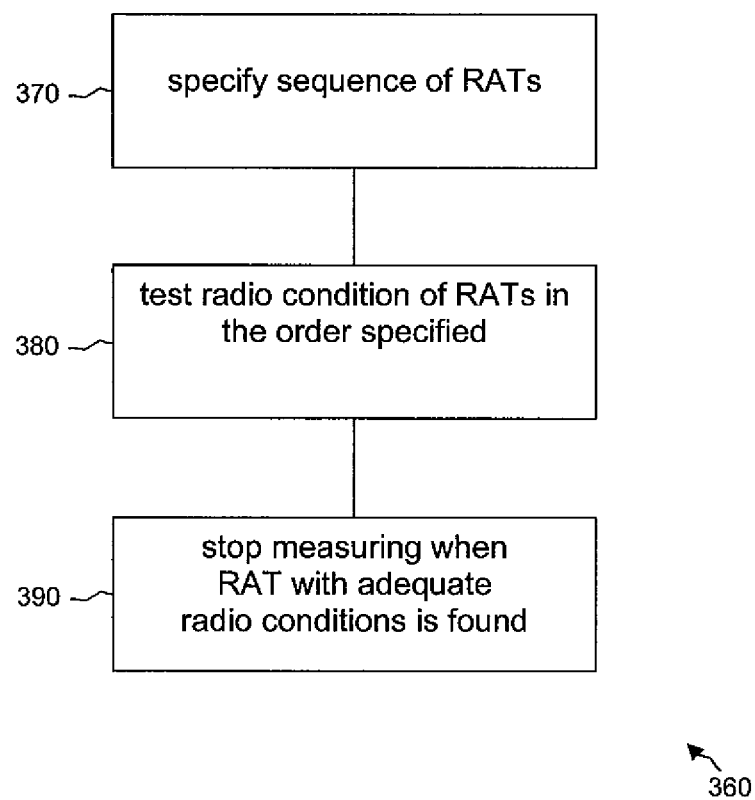
FIG. 5 is a diagram of a method for measuring at least one radio condition of each of a plurality of RATs according to an embodiment of the disclosure.

FIG. 5 illustrates an embodiment of a method 360 for measuring the quality of the radio conditions of a plurality of RATs. At block 370, a sequence of RATS is specified. The specification of the sequence might be made by a network component sending a first list of RATs to a UE. The first list might specify a prioritized order in which the listed RATs should have their radio conditions tested. Alternatively or in addition, the UE might have a second list specifying a preferred order in which the RATs listed in the second list should have their radio conditions tested. At block 380, the RATs are tested for radio condition quality in the order specified in the first list. Alternatively, in the case where the UE has the second list specifying the preferred order for testing, the preferences in the second list may take priority over the first list, and the RATs are tested for radio condition quality in the order specified in the second list. In either case, at block 390, the measurements of the quality of the radio conditions of the RATs cease when a RAT with radio conditions above a prespecified threshold is found. Thereafter, any communication handoffs or other related processes may occur.

Figure 6:
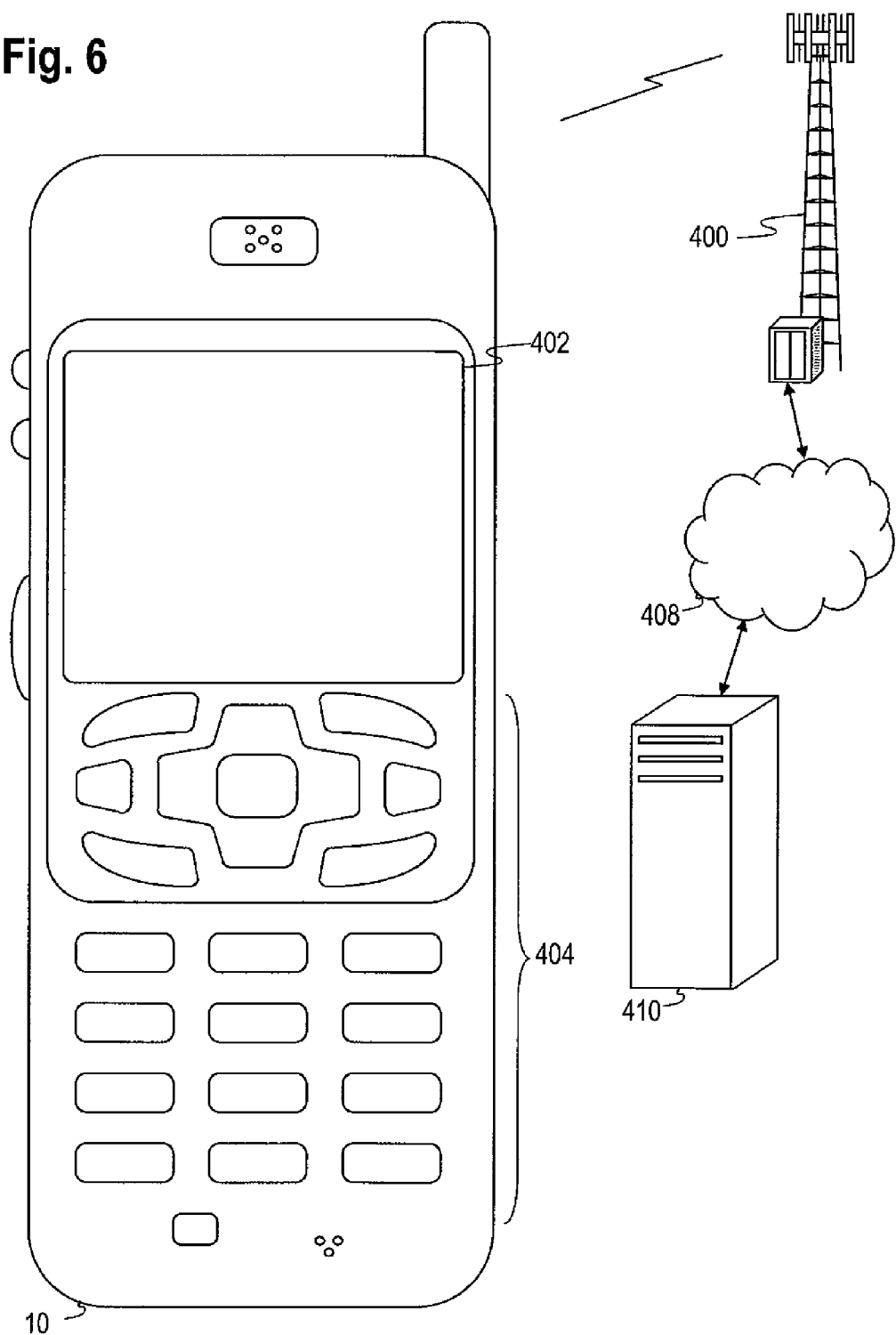
FIG. 6 is a diagram of a wireless communications system including a user equipment operable for some of the various embodiments of the disclosure.

FIG. 6 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 7:
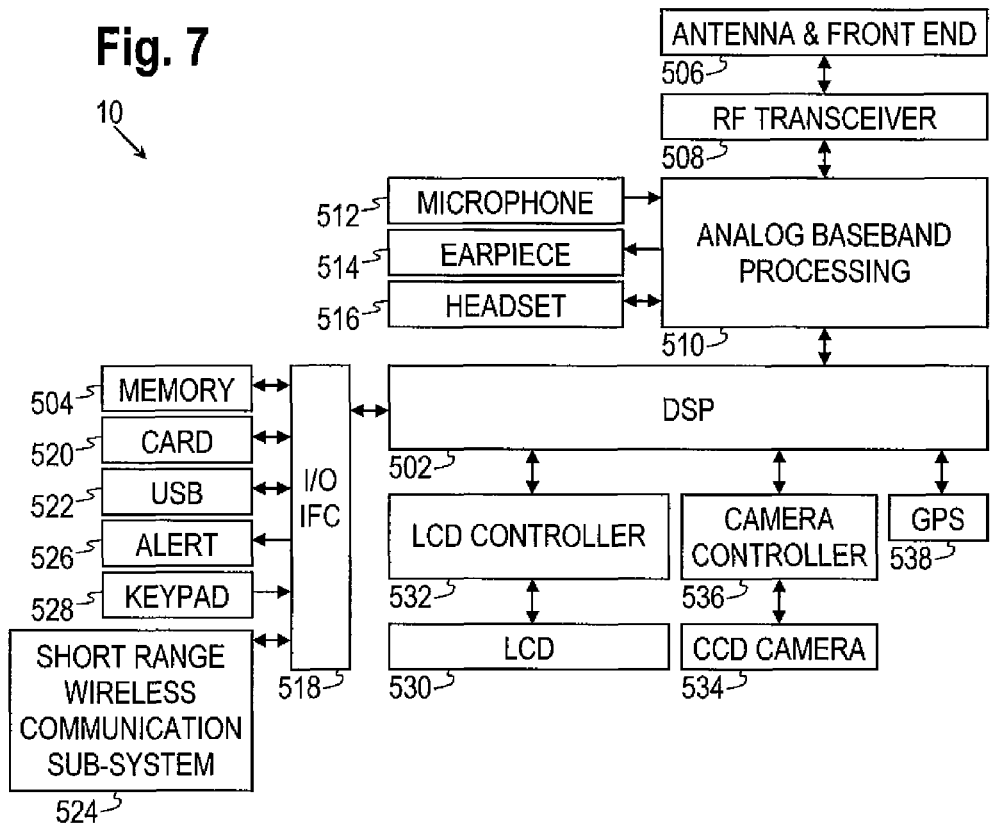
FIG. 7 is a block diagram of a user equipment operable for some of the various embodiments of the disclosure.

FIG. 7 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 8:
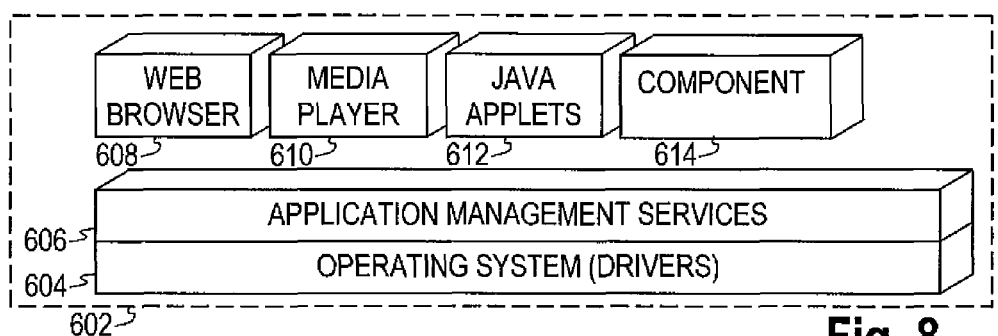
FIG. 8 is a diagram of a software environment that may be implemented on a user equipment operable for some of the various embodiments of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 8 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to measurement of radio conditions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of selecting radio access technologies (RATs) to be used by a user equipment for gaining network access, wherein each RAT provides radio access to a network, the method comprising:
   receiving, by the user equipment over a radio link, a first measurement sequence of RATs specified at a network component;
   obtaining, at the user equipment, a second measurement sequence of RATs specified by a user selection, wherein the user selection specifies an order for measuring the RATs in the second measurement sequence;
   measuring, by the user equipment, at least one radio condition of RATs in an order specified by one of the first measurement sequence or the second measurement sequence;
   stopping the measuring of radio conditions of the RATs when a quality of a measured radio condition associated with a RAT exceeds a predetermined threshold value; and
   selecting the RAT to be used by the user equipment for accessing the network,
   wherein if the quality of the measured radio condition does not exceed the predetermined threshold value, the user equipment continues the measuring of radio conditions even when the quality of the measured radio condition is sufficient to establish a connection to the network.

2. The method of claim 1, further comprising enabling the first measurement sequence of RATs to be modified by the user equipment.

3. The method of claim 1, further comprising:
   specifying the first measurement sequence of RATs in a first list; and
   specifying the second measurement sequence of RATs in a second list.

4. The method of claim 3, further comprising measuring at least one radio condition of RATs in the order specified in the second measurement sequence instead of in the order specified in the first measurement sequence when a difference exists between the first measurement sequence and the second measurement sequence, wherein the first measurement sequence of RATs in the first list is specified by the network component and wherein the second sequence of RATs in the second list is specified by the user equipment.

5. The method of claim 4, further comprising:
   storing the first list on the network component; and
   storing the second list on the user equipment.

6. The method of claim 1, wherein a first RAT in at least one of the first measurement sequence and the second measurement sequence is associated with a Third Generation Partnership Project (3GPP) network, and wherein a second RAT in the at least one of the first measurement sequence and the second measurement sequence is associated with a non-3GPP network.

7. The method of claim 6, wherein the 3GPP network is the network standardized by 3GPP, and includes one of the following networks:
   a GSM network;
   a GPRS network;
   an EDGE network;
   a GAN;
   a UTRAN network;
   a High Speed Packet Access (HSPA) network; and
   an Evolved UTRAN network.

8. The method of claim 6, wherein the non-3GPP network is the network that is not standardized by 3GPP, and includes one of the following networks:
   a Worldwide Interoperability for Microwave Access (WiMAX) network;
   a cdma2000 1x network;
   a High Rate Packet Data (HRPD) network;
   a Wireless Fidelity (WiFi) network; and
   a wireless local area network.

9. The method of claim 1, wherein a first RAT in at least one of the first measurement sequence and the second measurement sequence is associated with one of a circuit switched domain and a packet switched domain, and wherein a second RAT in the at least one of the first measurement sequence and the second measurement sequence is associated with one of a packet switched domain and a circuit switched domain.

10. The method of claim 1, wherein the measured radio condition is at least one of signal strength, path loss, propagation delay, received reference symbol power, and signal quality.

11. A system for selecting a radio access technology (RAT) to be used for gaining network access, wherein each RAT provides radio access to a network, the system comprising:

a network component specifying a first measurement sequence of RATs and transmitting the first measurement sequence to at least one user equipment over a radio link; and a user equipment configured to receive the first measurement sequence of RATs and to obtain and store a second measurement sequence of RATs specified by a user selection, wherein the user selection specifies an order for measuring the RATs in the second measurement sequence, the user equipment further configured to:

measure one or more radio conditions of RATs in an order specified by one of the first measurement sequence or the second measurement sequence;

stop measuring radio conditions when a quality of radio conditions associated with a RAT exceeds a predetermined threshold value; and select the RAT to be used by the user equipment for accessing the network, wherein if the quality does not exceed the predetermined threshold value, the user equipment continues to measure radio conditions even when the quality is sufficient to establish a connection to the network.

12. The system of claim 11, wherein the user equipment is operable to modify the second measurement sequence of RATs.

13. The system of claim 11, further comprising a telecommunications network configured to transmit the first measurement sequence to the user equipment, the user equipment measuring at least one radio condition of a first RAT in the order specified before measuring at least one radio condition of a second RAT in the order specified.

14. The system of claim 13, wherein the first RAT is associated with a Third Generation Partnership Project (3GPP) network and the second RAT is associated with a non-3GPP network, and wherein the non-3GPP network is the network that is not standardized by 3GPP and includes one of the following networks:

a Worldwide Interoperability for Microwave Access (WiMAX) network;
    a cdma2000 1x network;
    a High Rate Packet Data (HRPD) network;
    a Wireless Fidelity (WiFi) network; and
    a wireless local area network.

15. The system of claim 13, wherein the first RAT is associated with one of a circuit switched domain and a packet switched domain, and wherein the second RAT is associated with one of a packet switched domain and a circuit switched domain.

16. The system of claim 11, further comprising a preference list specifying the order of the second measurement sequence, the preference list order being different than and overriding the order specified in the first measurement list.

17. The system of claim 11, wherein the first measurement list is stored on the user equipment and can be modified by a user of the user equipment.

18. A multi-mode user equipment for selecting radio access technologies (RATs), wherein each RAT provides radio access to a network, the user equipment comprising:

a memory operable to store a second measurement sequence of radio access technologies (RATs) specified by a user selection at the user equipment, wherein the user selection specifies an order for measuring the RATs in the second measurement sequence; and a processor configured to receive a first measurement sequence from a network component over a radio link, and further configured to:

measure one or more radio conditions of RATs in an order specified by one of the first measurement sequence or the second measurement sequence;

stop measuring radio conditions when a quality of a measured radio condition associated with a RAT exceeds a predetermined threshold value; and select the RAT to be used by the user equipment to access the network, wherein if the quality does not exceed the predetermined threshold value, the user equipment continues to measure radio conditions even when the quality is sufficient to establish a connection to the network.

19. The user equipment of claim 18, wherein the order of the second measurement sequence is specified in a priority list.

20. The user equipment of claim 19, further comprising a preference list specifying the order of the first measurement sequence of RATs, the preference list overriding the priority list when a difference exists between the first measurement sequence and the second measurement sequence.

21. The user equipment of claim 18, wherein the measured radio condition is at least one of signal strength, path loss, propagation delay, received reference symbol power, and signal quality.

\* \* \* \* \*